(12) United States Patent
Sardella et al.

(10) Patent No.: US 7,424,554 B1
(45) Date of Patent: Sep. 9, 2008

(54) METHOD OF AND SYSTEM FOR CHANGING THE ADDRESS OF A DISK ARRAY ENCLOSURE

(75) Inventors: Steven D. Sardella, Marlborough, MA (US); Mickey S. Felton, Sterling, MA (US); Bernard Warnakulasooriya, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 302 days.

(21) Appl. No.: 10/955,355

(22) Filed: Sep. 30, 2004

(51) Int. Cl.
*G06F 3/00* (2006.01)
*G06F 15/177* (2006.01)
*G06F 12/00* (2006.01)
*G11B 7/24* (2006.01)

(52) U.S. Cl. ............... 710/3; 711/1; 711/200; 709/220; 709/221; 709/222; 709/223; 720/729

(58) Field of Classification Search .............. 710/3; 711/1, 200
See application file for complete search history.

(56) References Cited

U.S. PATENT DOCUMENTS 6,988,136 B2 * 1/2006 Sicola et al. ............ 709/224
2003/0140099 A1 * 7/2003 Beer et al. ............. 709/203
2004/0190545 A1 * 9/2004 Reid et al. ............. 370/451
2004/0193791 A1 * 9/2004 Felton et al. ............ 711/112
2004/0215842 A1 * 10/2004 Yardumian et al. ......... 710/9
2005/0050185 A1 * 3/2005 King et al. ............. 709/223
2005/0177683 A1 * 8/2005 Isobe et al. ............ 711/114
2005/0195075 A1 * 9/2005 McGraw et al. .......... 340/500

* cited by examiner

*Primary Examiner*—Niketa I Patel
(74) *Attorney, Agent, or Firm*—Krishnendu Gupta; Scott A. Ouellette

(57) ABSTRACT

An apparatus for setting an enclosure address in a computer system having a plurality of enclosures includes at least one enclosure address control device including input means for changing the enclosure address of an associated enclosure of the plurality of enclosures, a display device for indicating the enclosure address assigned to the associated enclosure, a controller for receiving an enclosure address change input from the input means and a logic device for resetting devices within the associated enclosure. The apparatus further includes a register device for receiving the enclosure address from the controller a predetermined period of time after the controller receives the enclosure address change input from the input means. After the predetermined period of time expires, the controller issues a command to the logic device for resetting the devices within the associated enclosure, to assign the changed enclosure address to the devices.

3 Claims, 8 Drawing Sheets

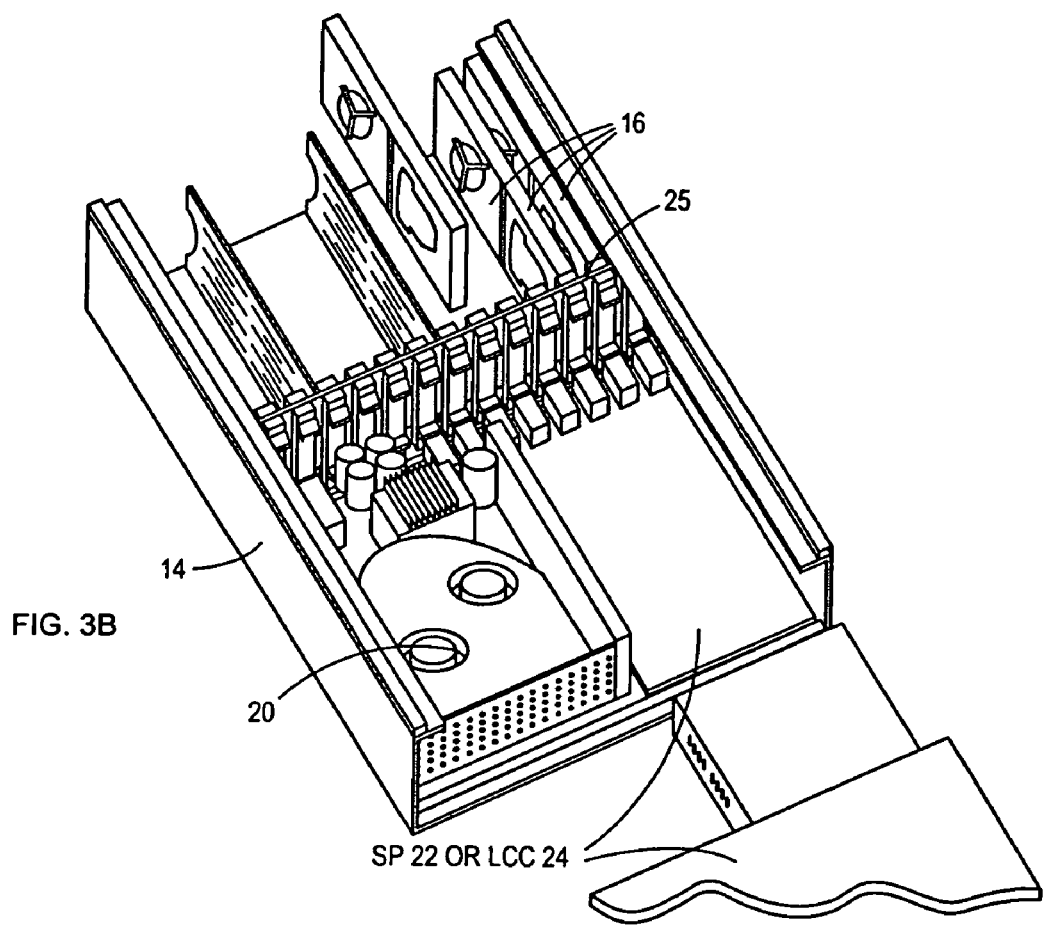

METHOD OF AND SYSTEM FOR CHANGING THE ADDRESS OF A DISK ARRAY ENCLOSURE

FIELD OF THE INVENTION

The present invention relates generally to storage systems, and more particularly to addressing of Fibre Channel disk drives in a storage system.

BACKGROUND OF THE INVENTION

Many current storage systems utilize an industry standard serial channel protocol known as Fibre Channel Arbitrated Loop. In accordance with this protocol, disk drives communicate with a server via a high speed serial link. The disk drives and server are interconnected in a ring or loop topology. Each disk drive on the loop has an individual address assigned to it, known as an Arbitrated Loop Physical Address (ALPA). Each Fibre Channel Arbitrated Loop can include up to 126 ALPAs.

Storage systems are commonly designed in a modular fashion, wherein a number of disk drives are installed within a standard rack mount enclosure such as a 3U enclosure. The enclosures are in turn installed in a rack mount chassis and interconnected to form the storage system. Individual disk ALPAs are assigned based upon the disk's position within the enclosure, and based upon the identity of the enclosure within the system. In some current systems, enclosure identity is determined through manual switch settings. This is disadvantageous because the switches consume valuable space on the enclosure and because human error can cause addressing problems. In other current systems, intelligence is provided in the rack mount chassis itself to set the enclosure addresses, disadvantageously adding cost and complexity to the chassis. It would be desirable to provide a disk drive addressing scheme that avoids these inadequacies and shortcomings.

SUMMARY OF THE INVENTION

In accordance with the principles of the invention, in a system including multiple enclosures, unique enclosure addresses can be set automatically via software. The enclosure addresses may be stored in non-volatile memory within the enclosures. The invention is useful in systems having several enclosures, each enclosure containing several devices, wherein each device requires a unique device address related to the enclosure in which it resides. For example, the invention is useful in Fibre Channel storage systems wherein each disk drive requires a unique address.

In accordance with more particular aspects of the invention, the enclosures are interconnected by a communications medium, and wherein the software causes messages to be exchanged between the enclosures via the communications medium to set the enclosure addresses. According to one embodiment, a method can cause enclosure addresses to be sent by sending a poll message, and then receiving a response message in response to the poll message, the response message including enclosure addresses for each enclosure in the system. The method then ascertains whether the enclosure addresses are unique. If the enclosure addresses are not unique, the method ascertains the position of an enclosure that has a non-unique address, and then sends an index message to the enclosure at the ascertained position. The index message includes a unique enclosure address for the enclosure at the ascertained position.

Similar apparatus and program products are provided for automatically setting enclosure addresses.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIGS. 3A and 3B are front and rear views of the disk drive enclosures of FIG. 1;

DETAILED DESCRIPTION

Figure 1:
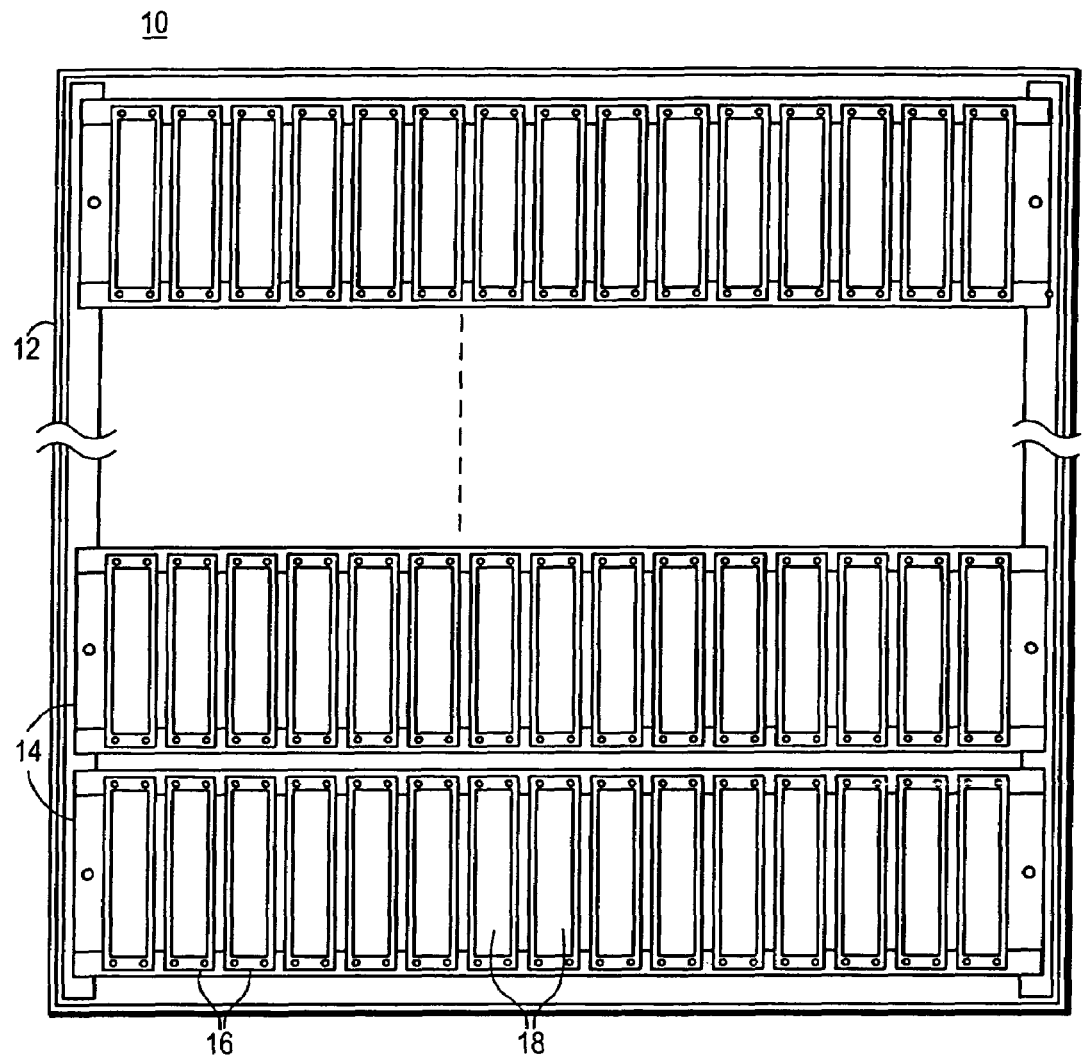
FIG. 1 is a representation of a rack mount system including several storage enclosures.
Figure 2:
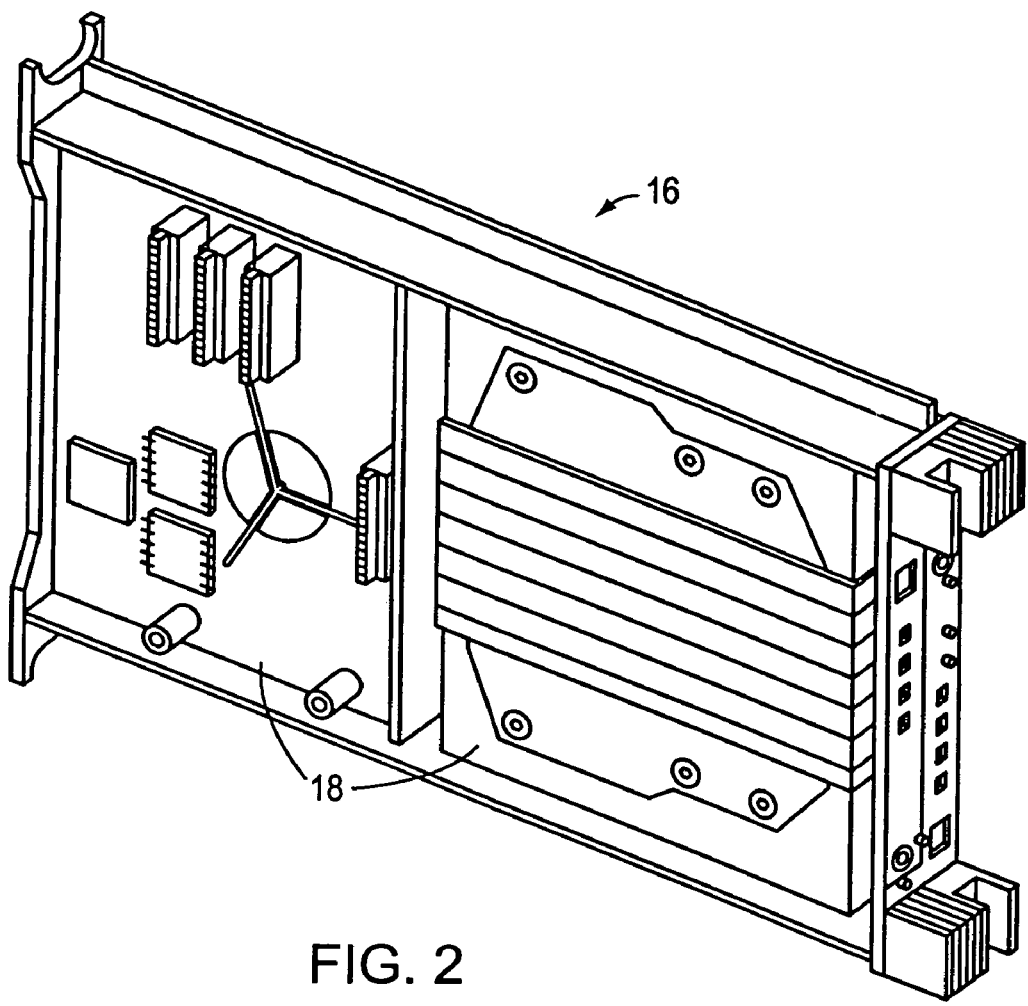
FIG. 2 is an assembly view of a carrier that contains two disk drives.
Figure 3A:
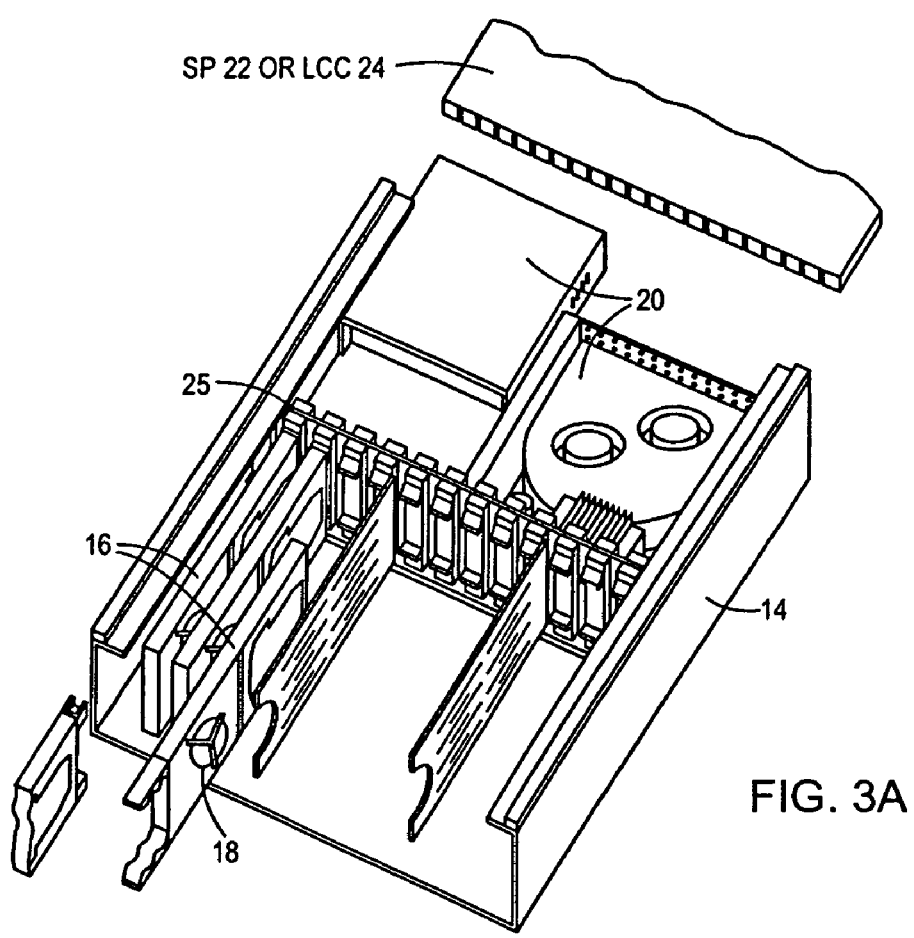
Figure 4:
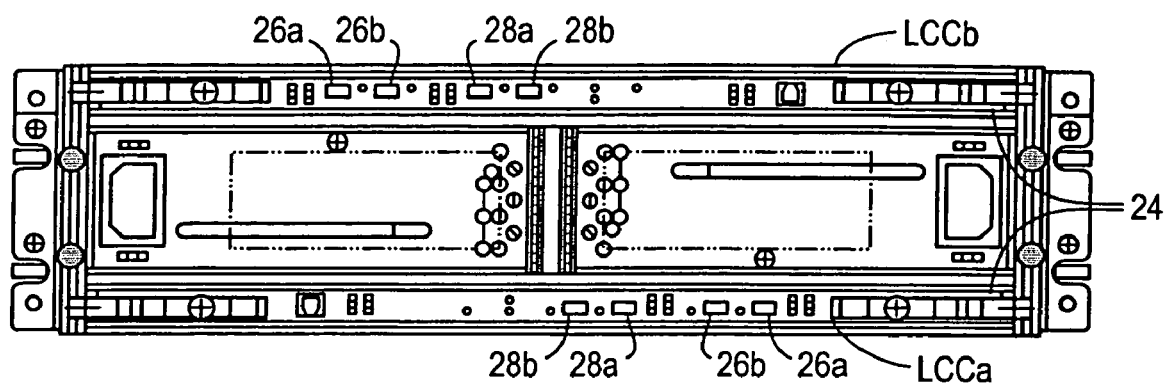
FIG. 4 is a rear view of a disk drive enclosure showing two power supplies and either two system processors or two link control cards.

Referring to FIG. 1, there is shown an example of a storage system 10 in which the present invention may be employed. A rack mount cabinet 12 includes several storage enclosures 14. Each storage enclosure 14 is preferably an EIA RS-310C 3U standard rack mount unit. In accordance with the principles of the invention, each storage enclosure 14 has installed therein several disk drive carriers 16, each carrier 16 including several disk drives 18. In FIG. 2 there is shown a carrier 16 including two disk drives 18. In FIG. 3 there are shown front and rear views of the enclosure 14. The enclosure 14 is shown to include 15 carriers 16. Each enclosure therefore contains 30 disk drives 18. The disk drives 18 are preferably Fibre Channel disk drives interconnected via a Fibre Channel Arbitrated Loop (FC-AL); however, the drives 18 may be compatible with other storage technologies such as Serial Advanced Technology Attachment (SATA) or Serial Attached SCSI (SAS). Up to eight enclosures 14 can be installed within the cabinet 12. Up to 120 disk drives can be included on a single FC-AL. So, 15 drives 18 per enclosure 14 are included on one FC-AL, while the other 15 drives 18 are included on a second FC-AL. The number of drives 18 per enclosure 14 and the number of enclosures 14 are shown by way of example; the invention is not limited to any particular arrangement.

As seen in FIG. 3, each enclosure houses two power supplies 20 and two system processors (SPs) 22 or two Link Control Cards (LCCs) 24. The SPs 22 or LCCs 24 are coupled to the disk drive carriers 16 via a midplane 25. Redundant components are provided for high availability. Typically, the first enclosure, referred to as enclosure 0, includes SPs 22, while the rest of the enclosures include LCCs 24. The SPs 22 control certain overall system functions, while the LCCs 24 serve to connect the disk drives 18 together on an FC-AL.

Figure 5:
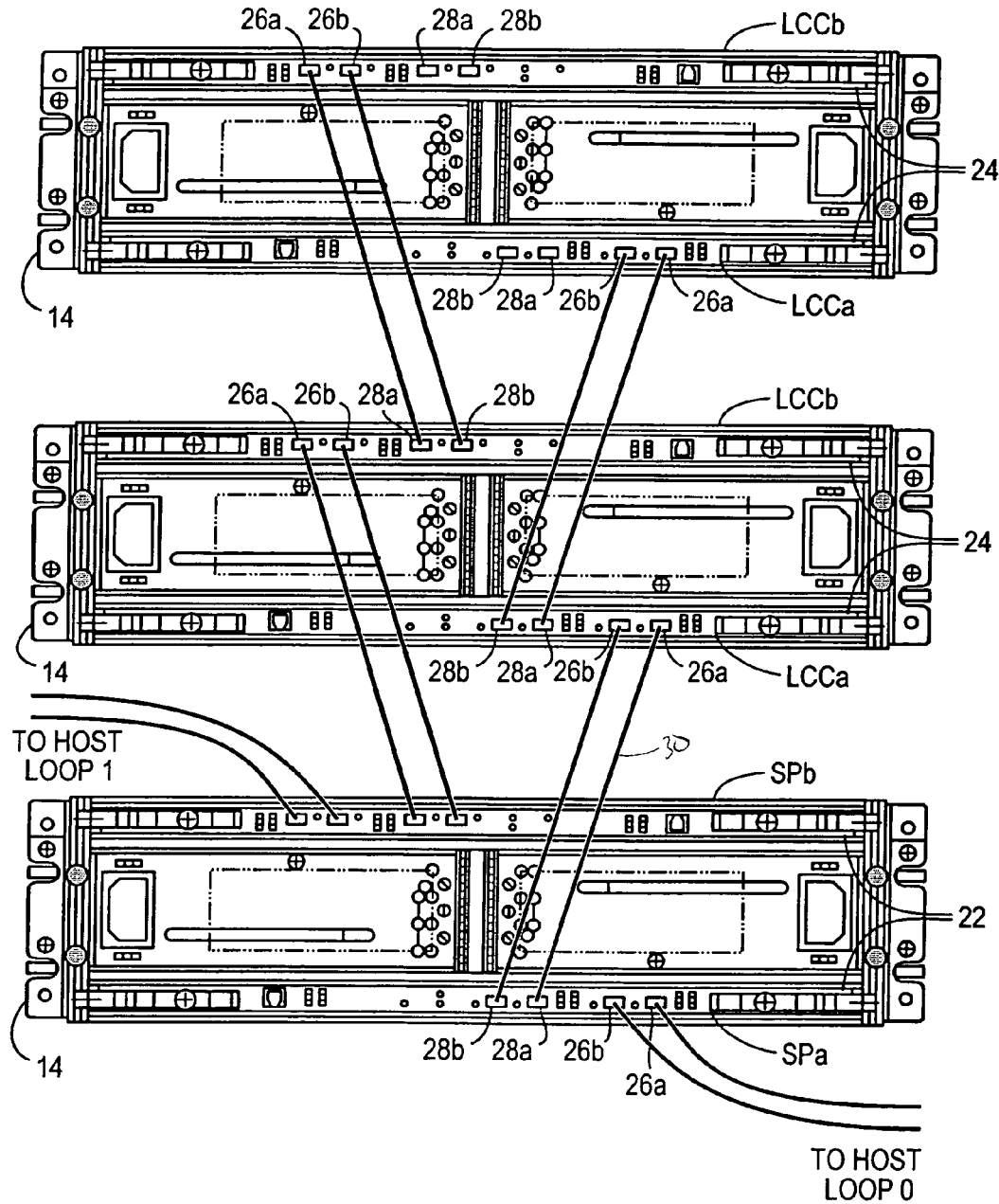
FIG. 5 is a rear view of the system of FIG. 1, showing how some of the separate enclosures are interconnected on Fibre Channel loops.

More particularly, referring to FIG. 5, there is shown an example of the manner in which three enclosures 14 are interconnected on a pair of redundant FC-ALs. The bottom enclosure 14 contains SPs 22, while the other two enclosures contain LCCs 24. The SPs 22 and LCCs 24 are arranged within their enclosures 14 such that they are inverted with respect to each other. The lower SPs 22 or LCCs 24 in each enclosure 14 are referred to as SPa or LCCa respectively. The upper SPs 22 or LCCs 24 in each enclosure 14 are referred to as SPb or LCCb respectively. Each SPa 22 or LCCa 24 includes two primary ports 26a,b and two expansion ports 28a,b. A first pair of FC-ALs herein referred to as "loop 0" interconnects the SPa and LCCa modules. Accordingly, an FC-AL enters a primary port, for example 26a, where it is connected to 15 of the drives. The FC-AL then extends out of the enclosure 14 via the expansion port 28a. The expansion port 28a is then interconnected via a cable 30 to a primary port 26a on the next enclosure in the cabinet, as shown in FIG. 5. A second FC-AL enters the second primary port 26b, where it is connected to the other 15 drives. The second FC-AL extends out the second expansion port 28b to connect to the second primary port 26b on the next enclosure 14, as shown. The remaining LCCa modules are connected in the same way, thus providing two separate FC-ALs connecting 120 drives each. Meanwhile, another pair of FC-ALs herein labeled "loop 0" similarly interconnects the SPb and LCC b modules.

In order to properly configure each FC-AL, each disk drive 18 on the FC-AL must be assigned a unique Arbitrated Loop Physical Address (ALPA). Each disk is assigned its ALPA based on its position in the enclosure 14 and based on an enclosure address, herein referred to as an Enclosure ID. Logic within each enclosure 14 assigns a select ID to each disk drive 18 based on its position in the enclosure 14 and based on the Enclosure ID. For example, if the first Enclosure ID is "0", then the 15 drives 18 in the first enclosure 14 have select IDs of 0-14. If the second Enclosure ID is "1", then the 15 drives 18 in the second enclosure 14 have select IDs of 15-29. So, the fourth disk drive 18 in an enclosure 14 with Enclosure ID 0 would have a select ID of "3", while the fourth disk drive 18 in an enclosure 14 with Enclosure ID 1 would have a select ID of "19". The select IDs are further translated into unique ALPAs for each disk drive 18.

Figure 6:
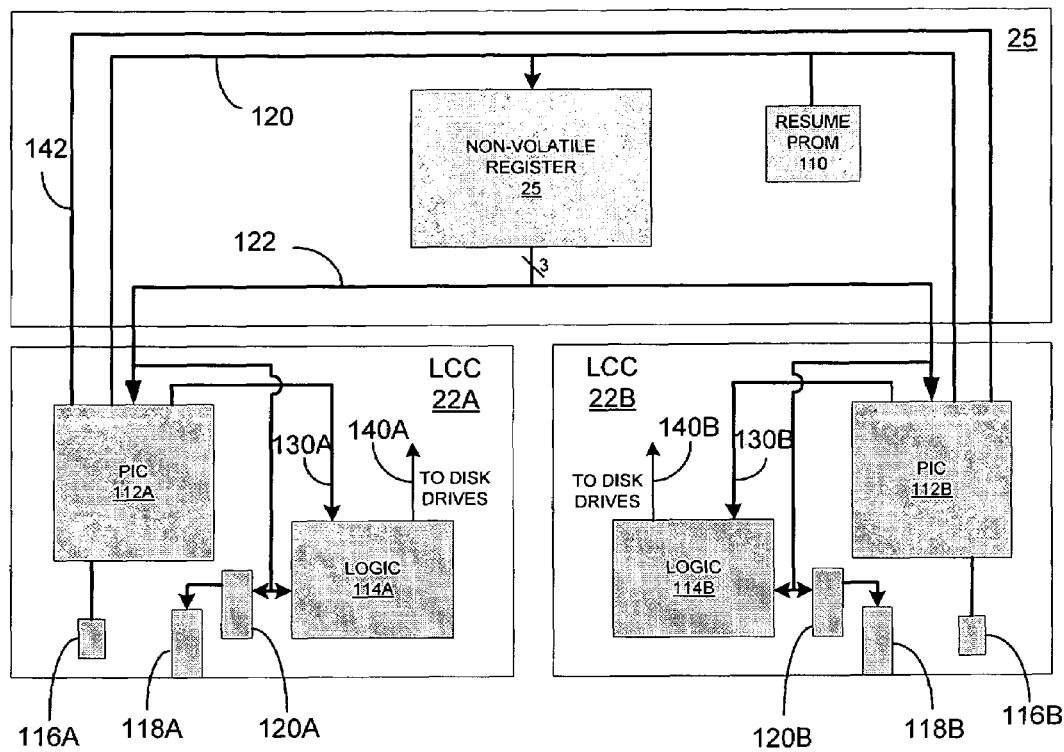
FIG. 6 is a schematic block diagram showing the apparatus for changing the enclosure ID in accordance with the invention.

FIG. 6 is a schematic diagram showing the apparatus 100 for controlling the Enclosure ID of each enclosure 14. The apparatus 100 is associated with one enclosure 14, as described above. Shown in FIG. 6 are the midplane 25 and the pair of LCCs 22A and 22B. The midplane 25 includes a non-volatile register 108 and a resume PROM 110. Each LCC 22A, 22B includes a PIC microcontroller 112A, 112B, a logic device 114A, 114B, a push button switch 116A, 116B, an LED display 118A, 118B and a decoder 120A, 120B.

As described below, the Enclosure ID assigned to the enclosure 14 is stored in the non-volatile register 108. Accordingly, when the data storage system is powered on, each PIC microcontroller 112 of each LCC 22 reads the Enclosure ID stored in the non-volatile register 108 via link 122, through which the 3-bit Enclosure ID is transmitted. The 3 bit Enclosure ID is also input to the decoder 118, which controls the LED display 118 to provide a visual indication of the Enclosure ID. Since the Enclosure ID can be one of only 8 different addresses, the LED display 118 includes 8 LEDs to indicate each of Enclosure IDs 0 through 7.

Once the data storage system is powered on and each PIC microcontroller 112 has received the Enclosure ID from the non-volatile register 108, each PIC 112 monitors its associated push button switch 116 for an input from a user of the system. Each time the push button switch 116 is depressed and released, the Enclosure ID is incremented by one. As a safeguard against a fault in the switch, such as a short, the Enclosure ID is not incremented until the push button switch 116 is released after being pushed. When one of the push button switched 116A, 116B is pushed and released, the associated PIC microcontroller 112A, 112B increments the Enclosure ID and writes the new Enclosure ID to the peer LCC via line 142 to notify the PIC microcontroller 112 that the Enclosure ID has been changed. Each PIC microcontroller 112 then outputs the new Enclosure ID to its logic device 114, over line 130, and the logic device 114 outputs a signal through the decoder 120 to change the LED display 118 to reflect the new Enclosure ID. In this way, regardless of which push button switch 116 is used to change the Enclosure ID, the PIC associated with that push button switch 118 notifies the PIC microcontroller 112 in the peer LCC 22 of the new Enclosure ID. The LED displays 118 are updated through the logic device 114 associated with each PIC microcontroller 112 to show the new Enclosure ID.

When the logic device 114 of each LCC 22 receives a notification from its PIC microcontroller 112 that the Enclosure ID has been changed, the PIC microcontroller 112 and logic device 114 enter a wait state, where the logic device 114 will wait for a predetermined period of time before performing a hard reset on the drives, to update the drives with the new Enclosure ID. In one embodiment, the predetermined period of time is five seconds. This insures that the drives will not be subjected to a "hard reset" until the user has settled on a particular Enclosure ID through one or more pushes of the push button switch 116. A hard reset forces the drive to resample its select IDs and to reassign its ALPA. This process is described in the SFF-8045 Specification for 40-pin SCA-2 Connector w/Parallel Selection Rev. 4.4, Dated May 22, 2001, which is incorporated by reference in its entirety herein.

Once the predetermined time period has expired since the last Enclosure ID change caused by the push button switch 116, the PIC microcontroller 112 whose push button switch 116 was pushed to initiate the Enclosure ID change writes the new Enclosure ID to the non-volatile register 108 over $I^2C$ bus 120. The new Enclosure ID is also input by the PIC microcontroller 112 to its associated logic device 114. The logic device outputs a command signal to the drives through line 140A, 140B that causes the drives to perform a hard reset. When the drives come back up after the hard reset, the new Enclosure ID is assigned to each of the drives.

Figure 7:
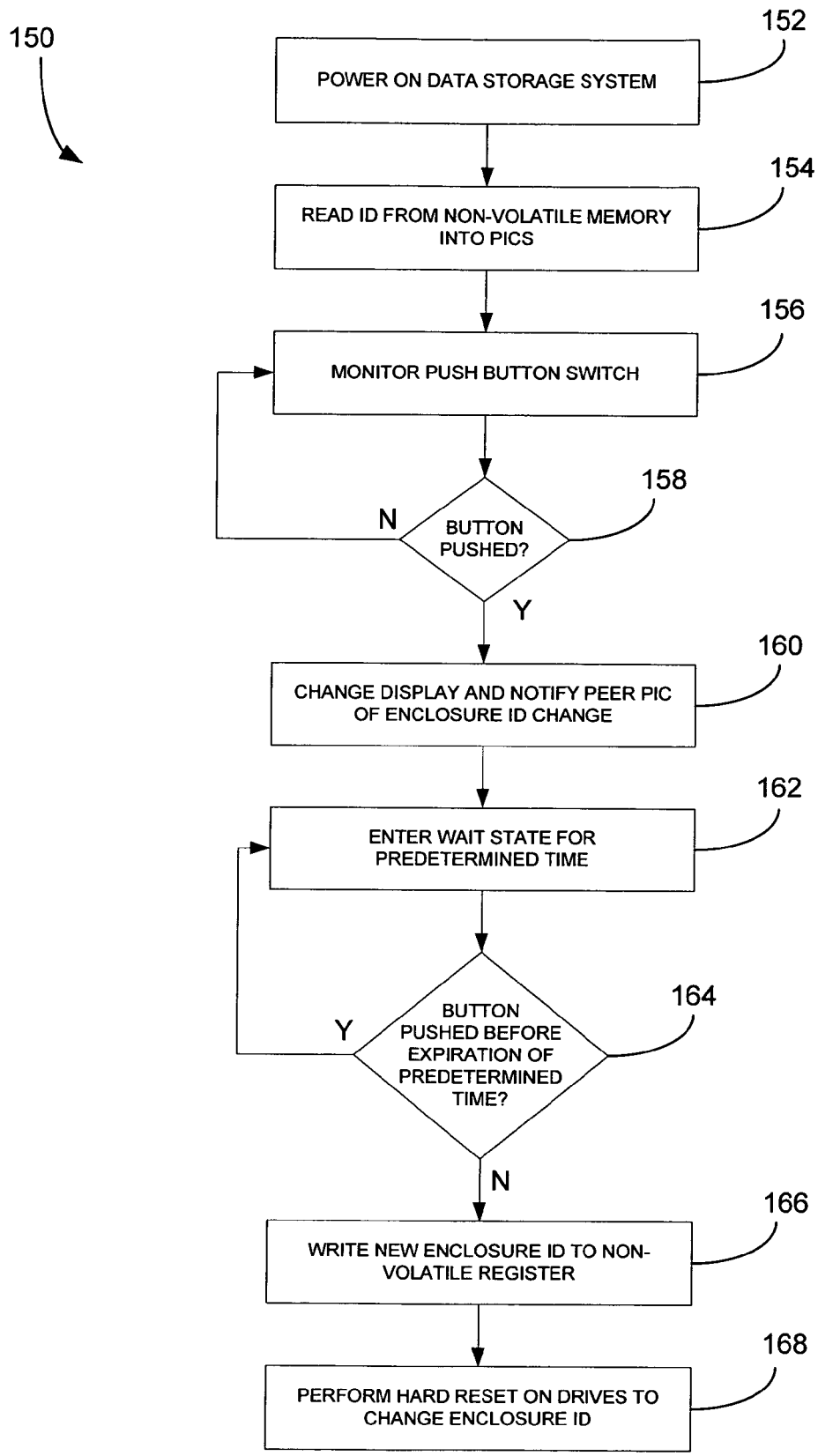
FIG. 7 is a flow diagram showing the steps involved in changing the enclosure ID in accordance with the invention.

FIG. 7 is a flow diagram 150 showing the steps carried out by the invention. In Step 152, the data storage system is powered on. The Enclosure ID stored in the non-volatile register 108 is read into each of the PIC microcontrollers 112, Step 154, and the PIC microcontrollers 112 monitor their associated push button switch 116, Step 156. When one of the push button switches 116 is pushed and released, Step 158, the associated PIC microcontroller changes its LED display 118 to reflect the new Enclosure ID and notifies the peer PIC microcontroller of the Enclosure ID change, Step 160, and enters a wait state for the predetermined period of time, Step 162. If the push button switch 116 is pushed and released before the expiration of the predetermined time, Step 164, the PIC microcontroller reenters the wait state for the predetermined period of time, Step 162. If the predetermined period of time expires before the push button switch is pushed and released, Step 164, the PIC microcontroller 112 writes the new Enclosure ID to the non-volatile register 108, Step 166, and issues a command to the logic device 114 to perform a hard reset on the drives to change the Enclosure ID with which the drives are associated, Step 168.

In one embodiment, the apparatus 100 is run in a remote mode, wherein the push button switch 116 of each LCC 22 is disabled, and the logic device 114 controls the changing of the Enclosure ID and the initiation of hard resets, as described above. This can occur when the enclosure powers up in local mode, during which time enclosure addresses can be modified locally by the pushbutton as described above. Once a Storage Processor detects the enclosure, it places it into remote mode, whereby it can send commands and receive status. At this point, the button is disabled to eliminate the chance of drives having their ALPAs accidentally changed in a running system.

Accordingly, the invention provides an apparatus for changing the Enclosure ID of a data storage device enclosure. The LCCs of the apparatus include PIC microprocessors that monitor associated push button switches. When a user of the data storage system desires to change the Enclosure ID, the push button switch is depressed and released to increment the Enclosure ID. The new Enclosure ID is displayed in the LCC display and communicated to the peer LCC, where it is also displayed. After a predetermined period of time with no change in the Enclosure ID, the new Enclosure ID is written to the non-volatile register and the logic device performs a hard reset on the drives, to change the Enclosure ID with which the drives are associated. The invention provides redundancy to the data storage device, since, even if one of the LCCs fails, the Enclosure ID can still be changed with the remaining LCC. Also, upon power-on if the $I^2C$ bus fails, the Enclosure ID can still be read by the PIC microcontrollers from the non-volatile register. For further redundancy, included in the midplane 25 on the $I^2C$ bus is a resume PROM 110 in which the Enclosure ID is also stored. In the event that the non-volatile register should fail, the Enclosure ID is available from the resume PROM.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, the invention is useful in any environment where remote controlled enclosure addressing is advantageous. For example, racks of computer or network equipment often need to be distinguished from one another. The present invention is useful for such purposes.

The invention claimed is:

1. An apparatus for setting an enclosure address in a computer system including a plurality of enclosures, the apparatus comprising:
   at least one enclosure address control device including input means for changing the enclosure address of an associated enclosure of the plurality of enclosures, a display device for indicating the enclosure address assigned to the associated enclosure, a controller for receiving an enclosure address change input from the input means and a logic device for resetting devices within the associated enclosure; and
   a register device for receiving the enclosure address, from the controller, a predetermined period of time after the controller receives the enclosure address change input from the input means.

2. The apparatus of claim 1 wherein, after the predetermined period of time expires, the controller issues a command to the logic device for resetting the devices within the associated enclosure, to assign the changed enclosure address to the devices.

3. A method of changing an enclosure address in a computer system including a plurality of enclosures, each enclosure including a plurality of devices, the method comprising:
   (A) operating the computer system with each of the plurality of enclosures having an enclosure address assigned thereto;
   (B) monitoring an enclosure address change input device associated with one of the plurality of enclosures;
   (C) upon receiving an input from the enclosure address change input device, entering a wait state for a predetermined period of time;
   (D) upon the expiration of the predetermined period of time, writing a changed enclosure address to a register associated with the enclosure; and
   (E) resetting the devices included in the enclosure to assign the changed enclosure address to the devices.

* * * * *